United States Patent [19]
Duncan et al.

[11] Patent Number: 5,531,638
[45] Date of Patent: Jul. 2, 1996

[54] MULTIPURPOSE HAND-HELD TOOL DESIGNED FOR USE WITH GRINDER

[76] Inventors: Stewart C. Duncan, 609 State St., Holly Hill, Fla. 32117; Ambers H. Capps, 61 Sherwood Forest Dr., Arden, N.C. 28704

[21] Appl. No.: 220,666

[22] Filed: Mar. 31, 1994

[51] Int. Cl.$^6$ .................................................. B24B 41/06
[52] U.S. Cl. .................... 451/364; 451/365; 451/369; 451/380
[58] Field of Search .................... 451/364, 365, 451/369, 370, 378, 380, 386, 387, 391, 405, 406, 411, 414

[56] References Cited

U.S. PATENT DOCUMENTS

| | | |
|---|---|---|
| 1,298,145 | 3/1919 | Yost . |
| 1,369,533 | 2/1921 | Nygren . |
| 1,411,713 | 4/1922 | Downing .................... 451/370 |
| 1,605,784 | 11/1926 | Schmitt .................... 451/370 |
| 2,103,074 | 12/1937 | Gardner . |
| 2,107,927 | 2/1938 | Weed .................... 451/380 |
| 2,318,052 | 5/1943 | Bramble et al. . |
| 2,394,202 | 2/1946 | Pollard .................... 451/380 |
| 2,534,941 | 12/1950 | Baldenhofer . |
| 2,632,983 | 3/1953 | Kapnick .................... 451/380 |
| 2,644,279 | 7/1953 | Stankovich .................... 451/380 |
| 2,733,559 | 2/1956 | Staudt, Sr. . |
| 2,794,433 | 6/1957 | Shanley . |
| 2,802,310 | 8/1957 | Chaplik .................... 451/365 |
| 2,865,149 | 12/1958 | Soave .................... 451/365 |
| 3,047,286 | 7/1962 | Kinne . |
| 3,086,293 | 4/1963 | Wharton . |
| 3,386,212 | 6/1968 | Lenhard . |
| 3,901,127 | 8/1975 | Stone .................... 451/365 |
| 4,228,618 | 10/1980 | Jensen .................... 451/414 |
| 5,301,473 | 4/1994 | Seear .................... 451/365 |

*Primary Examiner*—M. Rachuba
*Attorney, Agent, or Firm*—Julian C. Renfro

[57] ABSTRACT

A device for supporting a workpiece for being ground to size by the use of a grinding means, comprising a base member having a work-supporting means operably associated therewith. The base member supports the work-supporting means by a hinge member, with the base member and the work-supporting means normally being in an aligned relationship, but with the hinge member enabling the relationship of the work-supporting means to the base member to be angularly modified on occasion. The work-supporting means has thereon a work-clamping device constructed and arranged to hold a workpiece in a selected position, such that a portion of the workpiece held in the work-clamping device can be brought into direct contact with the grinding means. A depth-controlling member operably mounted upon the base member is positioned to normally contact a workpiece held in the work-clamping device. The position of the depth-controlling member is adjustable, so that the amount of material to be removed from the workpiece can be selectively controlled. A latch member under control of a user and operatively associated with the hinge member makes it readily possible to move the work-supporting means and its work-clamping device out of the aligned relationship, thus enabling an already-ground workpiece to be removed from the work-clamping device and an unground workpiece substituted, without altering the position of the depth controlling member.

23 Claims, 4 Drawing Sheets

5,531,638

MULTIPURPOSE HAND-HELD TOOL DESIGNED FOR USE WITH GRINDER

BACKGROUND OF THE INVENTION

This invention relates to improvements in apparatus for adjustably supporting a workpiece or the like while an operation is performed on the workpiece. The invention herein disclosed may be embodied as a part of or as an attachment to any of several different varieties of grinding machines.

It is of course well known in the art to provide a supporting member upon which a workpiece to be ground can be supported with respect to a grinding device, but in most instances, the arrangement is sufficiently inexact as to make it very difficult for a number of similarly configured workpieces to be ground in a consistently repeatable manner.

It was in an effort to overcome the shortcomings of such prior art devices as these that the present invention was evolved.

SUMMARY OF THE INVENTION

A highly satisfactory means for supporting a workpiece or component to be ground to size by the use of a grinding device may, in accordance with this invention, comprise a base member having a work-supporting means operably associated therewith, with the base member and the work-supporting means being operably interconnected, preferably by the use of a hinge member. The hinge member or hinge means makes it possible for the relationship of the work-supporting means to the base member to be readily changed by a user, should such be desired.

The work-supporting means has thereon a work-clamping device, with this work-clamping device being constructed and arranged to hold a workpiece or component to be ground in a selected position. The workpiece is supported in such a manner that a portion of the workpiece can be brought into direct contact with a grinding means, such as a bench grinder, belt grinder, disk grinder or the like.

Advantageously, a depth-controlling member is operably mounted upon the base member, with part of such member being in contact with the workpiece to be ground. The relationship of the depth-controlling member with respect to the base member can be readily adjusted. By a part of the depth-controlling member being in contact with the workpiece, the user, by controlling the position of the depth-controlling member, is selectively able to determine the amount of material removed from the workpiece by the grinding device. This highly significant arrangement makes it readily possible for a user to grind a large number of workpieces in a consistent and repeatable manner.

After a workpiece or component has been ground to a selected size and configuration it can, most significantly, be released without altering the position of the depth-controlling member by relative movement of the work-supporting means with respect to the base member, accomplished by the utilization of the hinge means.

Latch means are preferably utilized for controlling the relationship of the work-supporting means to the base member, with this latch means normally holding the work-supporting means in a rigid relationship to the base member. Upon manipulation of the latch means by a user, the work-supporting means can be readily moved about the hinge with respect to the base member.

Position-controlling means are attached to the work-supporting means, with this position-controlling means being usable for establishing a precise position of the work-clamping device and therefore the workpiece with respect to the grinding device. Means are provided for enabling a user to adjust the relationship of the position-controlling means to the work-supporting means.

One embodiment of our invention is particularly adopted to be used in conjunction with a single axis component, such as a bolt, rod or the like, whose end is to be ground in a particular manner. Another embodiment is adapted for the mounting thereon of a multiaxis component such as a U-bolt or the like. If desired, the user can accurately, and repeatably, grind the legs of the U-shaped member to a desired angularity, and the legs to different lengths.

It is to be understood that our novel device is readily adapted to be supported in operative relation to a bench grinder, belt grinder, disk grinder or the like, for generating and duplicating both simple and complex contours.

It is a primary object of this invention to provide a device of straightforward and inexpensive construction, making it readily possible to consistently grind a number of differently shaped workpieces to a desired length and angularity.

It is another object of this invention to provide a means for mounting a workpiece of specified construction, such as of U-shaped configuration, in a workpiece-receiving device held in operative relationship to a grinder means, with the workpiece being mounted in such a way as to enable a user to grind numerous workpieces to a consistent angularity and length.

It is yet another object of this invention to provide a base member interconnected with a novel workpiece-supporting device by the use of hinge means, with this arrangement making it readily possible to remove an already-ground workpiece from the workpiece-supporting device, and then insert a new workpiece to be ground to a specified configuration, without having to modify the desired relationship of the workpiece to a depth-controlling member utilized in cooperation with the base member, which member is utilized for assuring a consistent relationship of the workpiece to the grinder means.

It is yet still another object of our invention to provide a base member supporting a pair of positioning rods disposed in a spaced-apart, parallel relationship to the base member, where a work-supporting means operatively associated with such base member supports a workpiece to be ground at a specific angle, with the appropriate placement of the positioning rods in dissimilar positions enabling the end or ends of a single workpiece, or of a plurality of similar workpieces, to be ground to a specific and consistent angle. If desired, a protractor may be mounted on the base member, for simplifying the accurate positioning of the positioning rods.

These and other objects, features and advantages will become more apparent from a study of the appended drawings.

BRIEF DESCRIPTION OF THE DRAWINGS

FIG. 1a fragmentary perspective view to a large scale of the clamping arrangement utilized in FIG. 1 for holding a single axis component a rotatable relationship, with a portion of the clamping device broken away to reveal internal construction;

FIG. 1b is a fragmentary perspective view of the arrangement that may be utilized for securing the work-clamping arrangement in a desired location with respect to the work-supporting means, with a portion of the device broken away to reveal details of the mounting arrangement;

FIG. 2a is a fragmentary view to a somewhat larger scale revealing the use of adjustable spacing device in conjunction with the grinding of the single axis component of the type revealed in FIG. 1;

FIG. 5 s a view similar to FIG. 3 but showing the use of an even larger work-supporting means than depicted in FIG. 3, in order that U-shaped components of substantial width can be ground in a desirable manner; and FIG. 5a is a fragmentary view of the arrangement utilized to hold the protractor of FIGS. 4 and 5 in a selected rotational position.

DETAILED DESCRIPTION

Figure 1:
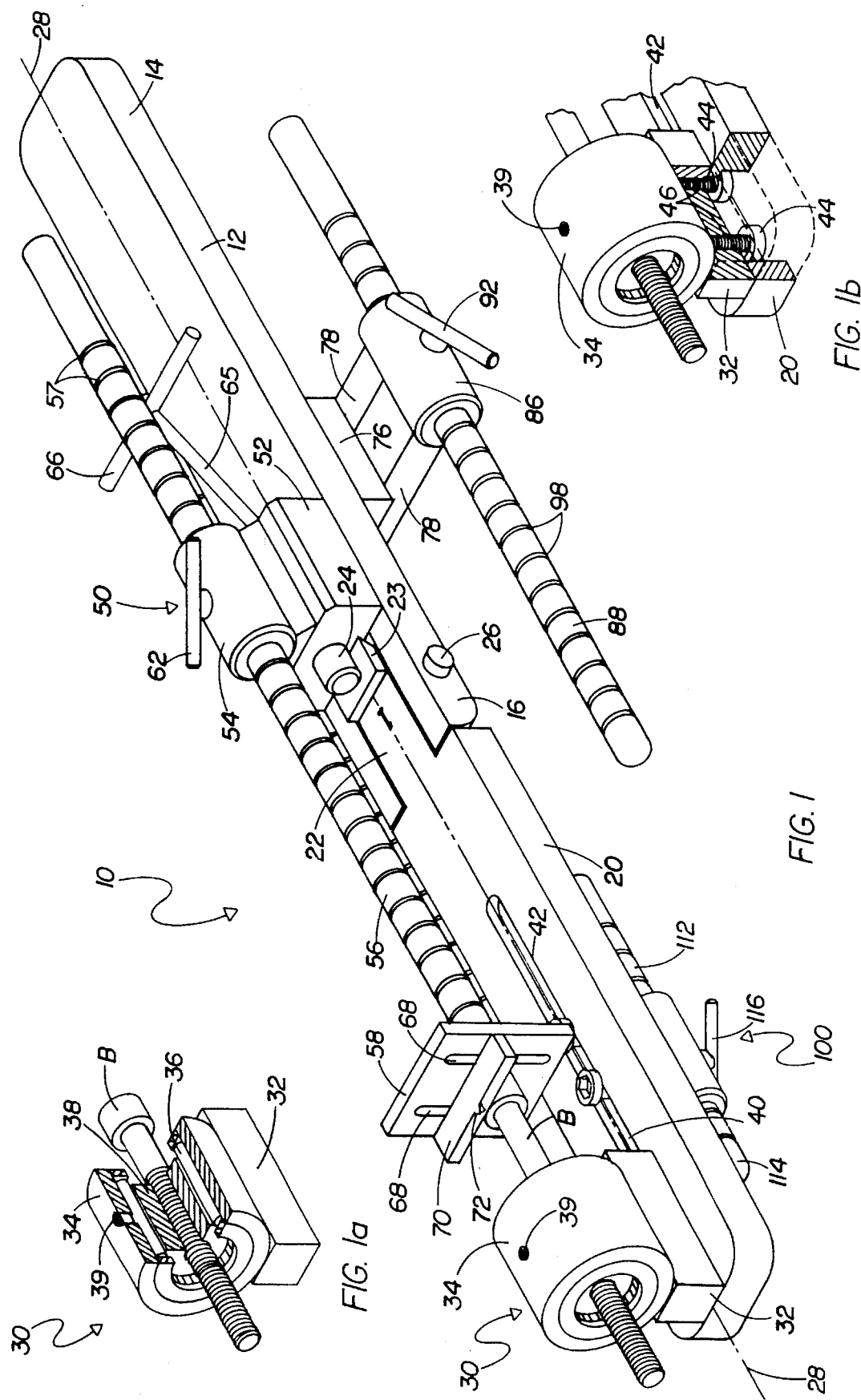
FIG. 1 is a perspective view of our novel hand-held tool arranged to support a single axis component such as a bolt in a position enabling a selected, precise amount of metal to be removed from one end of the bolt as a result of contact with a grinding means.

With initial reference to FIG. 1, it will there be seen that we have illustrated a portion of a tool 10 configured to hold a component or workpiece such as a bolt B, in such a position as to readily permit the outer end of the component to be ground to a certain length and/or a certain angle, by contact with a grinding means such as bench grinders, belt grinders, disk grinders and the like. However, our tool is not limited to use with grinding devices, for it could be used with other type devices on certain occasions Our tool 10 is principally made up of a base member 12, having a handle portion 14, and a work-supporting means 20, which is equipped with a work-clamping device 30 serving to support in a very appropriate and stable manner, a bolt B or other such component or workpiece to be ground or contoured in accordance with a carefully designed mounting arrangement described in detail hereinafter. On the opposite end of the base member 12 from the handle portion 14 is a clevis-shaped (fork-shaped) arrangement 16, between the members of which an elongate portion 22 extends. The elongate portion 22 is a part of the work-supporting means or member 20, with a latch member 23 disposed on the end of the portion 22 farthest from the work-clamping device 30 utilized for supporting the component B.

It is to be understood that a longitudinal centerline 28—28 passes through the base member 12 and the work-supporting means 20, with both of these members being symmetrically disposed about the longitudinal centerline 28—28.

An interconnection means is utilized for operably connecting the base member to the work-supporting means, which interconnection means preferably takes the form of a hinge pin 26. The hinge pin is disposed in a perpendicular relationship to the centerline 28—28, with the hinge pin passing through suitable aligned apertures in the portions 16 and 22. Pin 26 is thus being utilized to hold the base member and the work-supporting means in what may be regarded as a hinged relationship. We may also regard the pin 26 as being an intrinsic part of a hinge, hinge means or hinge member. The normal or operative relationship of the base member 12 and the work-supporting means 20 is illustrated in FIG. 1, where the latch member 23, by its interaction with spring biased latch pin 24, serves to hold the members 12 and 20 in a fixed relationship. Preferably the base member 12 and the work-supporting means reside in what may be regarded as a common plane. We refer collectively to the latch member 23 and the latch pin 24 as the latch means.

Figure 2:
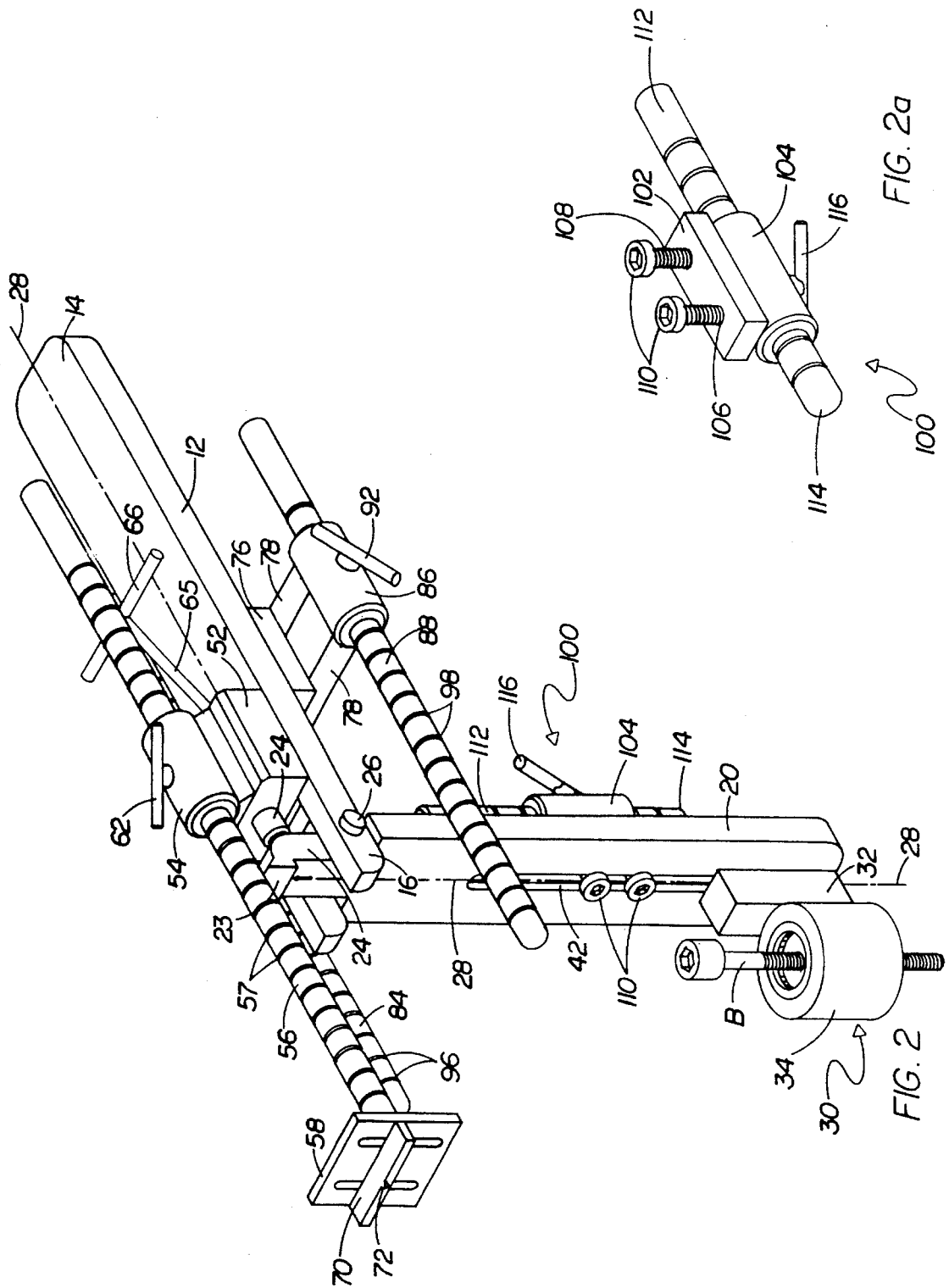
FIG. 2 is perspective view illustrating how the work-supporting means of our novel hand-held tool can be rotated downwardly about a pivot location so as to permit the removal of an already-ground component and the substitution of a new component, this being accomplished without affecting the accuracy of the depth-establishing device we utilize on the base member in order to obtain consistency of length and angularity of the components being ground.

With reference now to FIG. 2, it will be noted that in this figure we reveal the work-supporting means 20 having been moved downwardly for at least 90° about the hinge pin 26, and preferably for an angular extent of 135°. By the work-supporting means 20 being rotated for a limited yet substantial extent about the hinge pin 26, the work-clamping device 30 assumes a position such that an already-ground component B can be readily removed from the work-clamping device 30, and a new component to be ground easily substituted. Quite significantly, this is readily accomplished without disturbing the depth settings we utilize for consistency in the grinding of workpieces, which features we will describe hereinafter.

As will be noted from FIG. 2, the latch member 23 is located on the far side of the hinge pin 26 from the work-clamping device 30, and from FIG. 1 it will be noted that the work-clamping device 30 as well as the component B carried therein are located upon the longitudinal centerline 28—28, and mounted quite close to the front end of the work-supporting means 20.

It is thus to be seen that the hinge arrangement involving the pin 26 makes it readily possible for the work-supporting means 20 to be selectively moved from the operational position or co-planar relationship with the base member 12 as shown in FIG. 1, to an angular relationship with the base member 12 as depicted in FIG. 2. Then, after a new component to be ground has been inserted into the work-clamping device 30 subsequent to the removal of the already-ground component, the work-supporting means is returned to the operational position depicted in FIG. 1, FIG. 3, and certain other figures. The previously mentioned spring biased latch pin 24, hereinafter described at further length, is positioned to engage the rigidly mounted latch member 23, and thus hold the work-supporting means 20 stably in the operational position, in which it is coplanar relationship with base member 12.

In the embodiment of our invention depicted in FIGS. 1 and 2, the work-supporting means 20 is comparatively narrow, which is ideal when a single axis component such as a bolt, rod or the like is being ground by the use of a grinding device.

Figure 3:
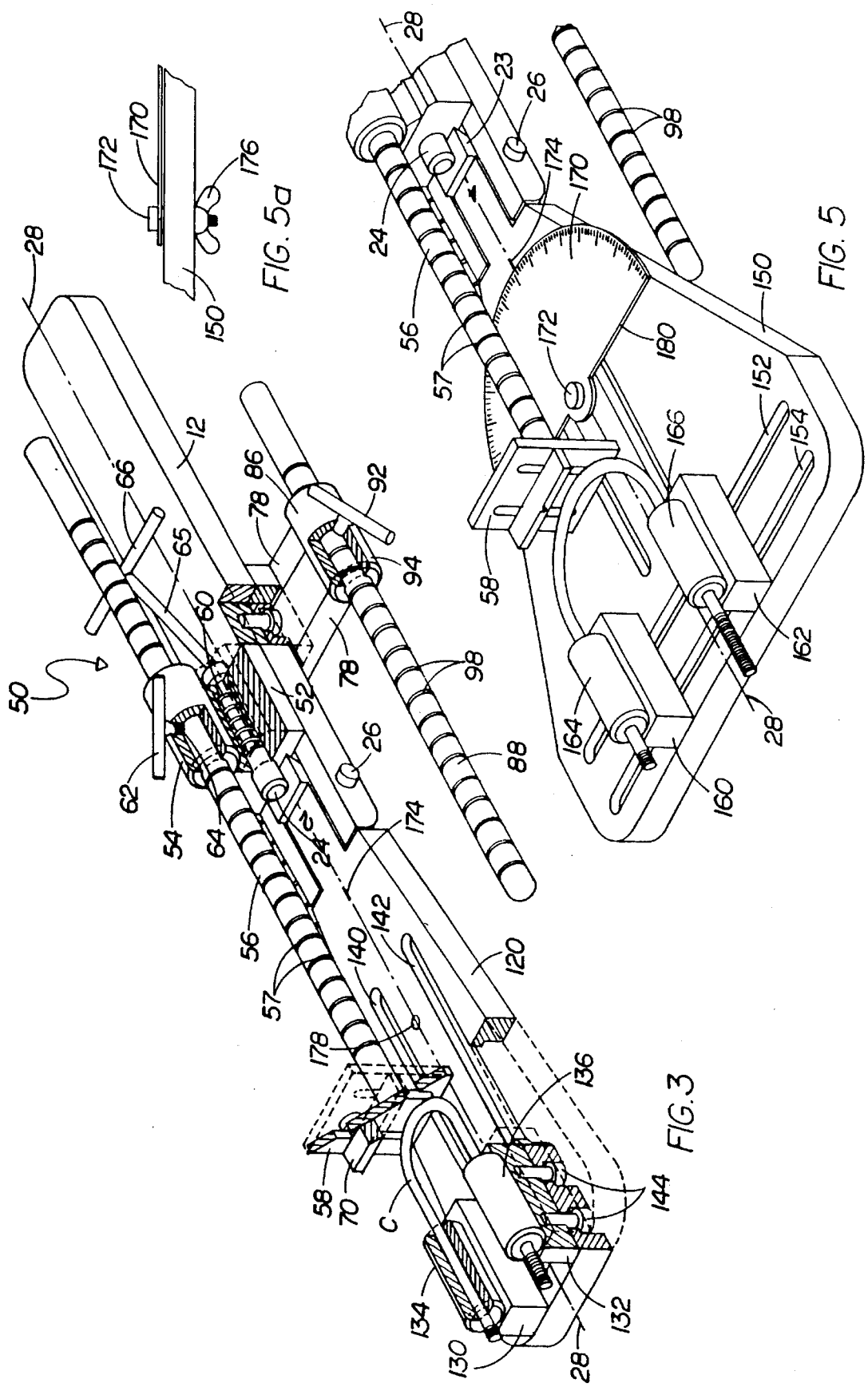
FIG. 3 is a perspective view similar to FIG. 1, but in this instance utilizing a somewhat enlarged work-supporting means, the construction of which enables U-shaped components of various sizes to be held to a precise angularity, such that the ends of each of a series of U-shaped components can be ground in a consistent manner.
Figure 4:
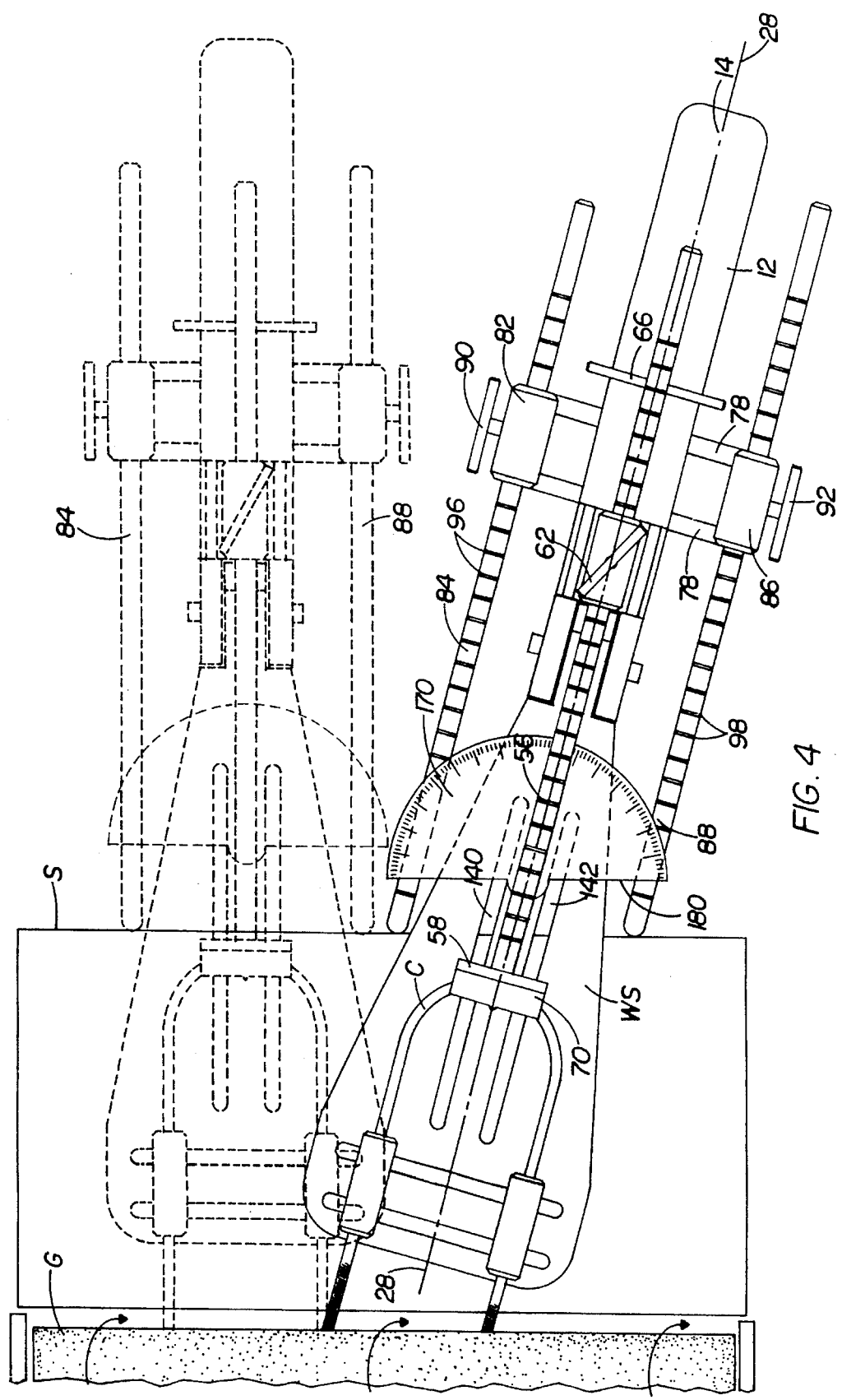
FIG. 4 is a plan view of our device, revealing in full lines that our novel hand-held device utilizes separately adjustable positioning rods, enabling each of a series of U-shaped components to be ground to a consistent angularity and length, and also revealing by the use of dashed lines how each of a series of U-shaped components may be ground in such a manner that both legs of a U-shaped compare of identical length.

It is important to note that we are not to be limited to the specific type of work-supporting means 20 depicted in FIGS. 1 and 2, for as will be seen in detail hereinafter, we may substitute a work-supporting means of a different configuration for the work-supporting means 20 when a different type of component or workpiece is to be ground. FIGS. 3 through 5 depict work-supporting means of somewhat larger size, which may support components of U-shaped configuration, for example.

To facilitate the substitution of one work-supporting means for another, we prefer to utilize a hinge pin 26 having a raised shoulder at one end. A knurled nut or other securing means is utilized at the other end of the hinge pin to prevent unwanted displacement of the pin from its position connecting the base member 12 to the selected work-supporting means.

With reference now to FIG. 1a, it is to be seen that a portion of the work-clamping device 30 has been cut away so as to reveal that a structural member 32 is utilized upon the work-supporting means 20 for supporting a housing 34 of generally circular configuration. The underside of the housing 34 is typically welded to the upper surface of the structural member 32. The housing 34 has a circular interior in which a needle bearing 36 is operatively mounted. The interior of the needle bearing 36 receives a circular bushing 38, in the interior of which bushing, the workpiece or component B to be ground can be closely received. We prefer for the bushing to be press-fitted into the needle bearing 36, so that these members in effect become one unit, hereinafter referred to as a bushing unit. We prefer to use a locking device 39 known as a grub screw for maintaining the selected bushing unit in the desired location in the housing 34.

Knowing the diameter of a specific component B to be ground, we select a bushing 38 whose inner diameter will rather closely receive the component B. We prefer to stock a series of bushing units of graduated sizes, so that a comparatively wide range of components to be ground can be readily accepted. Because of the provision of the needle bearings, the single axis component B carried in the bushing can rotate during the procedure of grinding the end of the component.

Inasmuch as we may wish to mount components of different size and configuration on the end of the work-supporting means 20, we arrange for the position of the work-clamping device 30 on the work-supporting means to be readily adjustable, and to that end we utilize suitable position-controlling means 40, one aspect or part of which is a slot 42 extending for some distance along the work-supporting means 20. The slot 42, best seen in FIGS. 1 and 1b, is disposed along the longitudinal centerline 28—28, and extending through this slot are a pair of bolts 44. The bolts 44, visible in FIG. 1b, engage threaded holes 46 provided in the underside of the structural member 32, so that when the member 32 has been slid to an appropriate position on the work-supporting means 20, the bolts 44 may be tightened so as to hold the structural member 32 tightly in the desired position in the slot 42. The heads of the bolts 44 are of large enough size as to engage the work-supporting means 20 on both sides of the slot 42.

When our device is to be utilized with a component to be ground that is of a length or configuration substantially different from that previously ground, it is desirable to loosen the bolts 44 so that the structural member 32 can if necessary be moved to a new location on the work-supporting means 20. We may refer to the bolts 44 as the adjustment means enabling a user to readily adjust the position or relationship of the work-clamping device to the work-supporting means. It is to be borne in mind that the bushing unit, comprising a needle bearing 36 and bushing 38, can be removed so that a bushing unit having the correct inside diameter can be substituted in order to properly receive the new component. Typically the bushing does not impose more than a relatively small restraint upon the longitudinal positioning of the workpiece therein.

It is important to note that means must be provided for preventing the component B from "retreating" when the outer end of such component is brought into forceful contact with the grinding means. To that end, we provide in accordance with this invention, a novel, highly advantageous depth-establishing device 50 that can be adjusted to come into contact with the end of the component B remote from the end being ground, thus to effectively prevent the component from moving along its longitudinal axis away from the grinding means.

Of significance to this invention is the depth-establishing device 50 we prefer to use, which is to be seen in FIG. 1 to involve the use of a mounting means 52 secured on the base member 12 at a location remote from the handle portion 14, or in other words, the mounting means 52 is located comparatively near the location of the hinge pin 26. On the mounting means 52 a collet member 54 is operably mounted, with the interior diameter of the collet member being such as to slidably receive a slide member or slidably mounted depth-controlling member 56. The front end of the slide rod or depth-controlling member 56 of the depth establishing device 50 has an enlarged, component-contacting member 58, so that components to be ground can be of a widely varying size and/or configuration, with the enlarged member 58 assuredly being of sufficient size to contact the end of the component B remote from the end to be ground or contoured. For obvious reasons we may refer to the slide member or depth-controlling member 56 as being a depth-controlling member or depth-controlling means, whose longitudinal position may be readily adjusted by the user. To be noted is the fact that we may provide evenly spaced marks or indicia 57 along the length of slide member or depth-controlling member 56 for facilitating its placement in a particular and consistent longitudinal position or location.

As visible in FIG. 1, our depth-establishing device 50 also includes a tightening device 62 that is operably mounted on the collet 54. As visible in FIG. 3, the tightening device involves a screw-threaded member 64 that is threadedly received in the sidewall of the collet 54, such that the innermost end of the threaded member can be brought into firm contact with the depth-controlling member or slide member 56, in order that the slide member 56 can be locked in a desired position. As is obvious, the slide member or depth-controlling member 56 may be readily adjusted to different positions, and by virtue of this arrangement, the near end of the component or workpiece to be ground can be held firmly in a desired position. Quite importantly, the opposite end of the component or workpiece, which of course is the end to be ground, can be maintained in a desired relationship to the bench or other support member upon which a bench grinder, belt grinder, disk grinder or the like is mounted.

It is thus to be seen that firm contact of the enlarged member 58 of the slide member 56 with the rear (near) end of the component B makes it readily possible for a user of our device to accurately grind the ends of numerous, substantially identical components to a consistent configuration, as will be further described in subsequent figures.

It is to be noted that we provide a pair of vertically disposed slots 68 in the enlarged, component-contacting member 58 in order to provide a ready means for securing a short, horizontally disposed member 70 upon the side of the member 58 opposite the slide member or depth-controlling member 56. A pair of screws (not illustrated) inserted from the backside of member 58 through the slots 68 enable the member 70 to be held in a selected location on the member 58. By loosening such screws, the height of the member 70 can be vertically adjusted to accommodate different shaped and differently sized heads of bolts. This member 70 can also be adjusted to accommodate different thicknesses of U-bolts. A centering pin 74 in the form of a raised cone or tip visible in FIG. 1 is provided in a center location on the horizontally disposed member 70 in order to enable a single axis component such as the component B to spin freely about the centering pin 74. This may be analogized to the use of a centering pin on a lathe.

With regard now to a further consideration of FIG. 1, it will be seen that a cross member 76 is mounted on the lower side of the base member 12, with a pair of essentially parallel mounting rods 78 tightly affixed to the underside of member 76, in what may be regarded as an orthogonal relationship to the longitudinal centerline 28—28 of the members 12 and 20. Supported on each end of the rods 78 is a slide guide or collet, with collet 82 intended to receive the slide member or positioning rod 84, and collet 86 being intended to receive slide member or positioning rod 88. Although the collet 82 and slide member or positioning rod 84 are not shown in FIG. 1, these members are clearly visible in FIG. 4.

It is to be understood that the slide members or positioning rods 84 and 88 are disposed in a spaced-apart, parallel relationship with the longitudinal centerline 28—28 common to the base member 12 and the work-supporting means 20 that together constitute our tool 10. The forwardmost ends of the positioning rods 84 and 88 are intended to be brought into contact with the bench or other structure upon which the grinding means is mounted, to set the relationship of the work-supporting means to the grinding means. We therefore regard the rods 84 and 88 as positioning rods, and as noted in FIG. 4, the forward ends of these rods may be extended to dissimilar positions, which is made clear in the full line position of our novel tool in this figure. It should now be clear that by setting the slide members or rods 84 and 88 in an unequal length relationship, such as illustrated in full lines in FIG. 4, the end or ends of the selected component can be ground to a desired angularity. On the other hand, by setting the slide members or rods 84 and 88 in an evenly spaced relationship, in the manner shown in dashed lines in FIG. 4, the workpiece or component held in the work-clamping device 30 may be ground to have square end or ends. This highly advantageous capability of our device that enables the legs of a U-bolt to be accurately ground to unequal lengths will be described in more detail shortly, in conjunction with subsequent figures.

Readily seen in FIGS. 1 and 2 is a tightening device 92 operably mounted on the collet 86, involving a screw-threaded member 94 that is threadedly received in the sidewall of the collet 86, such that the inner end of the threaded member can be brought into firm contact with the positioning rod or slide member 88, in order that this slide member can be locked in a desired position. As to be seen in FIG. 4, a similar locking device 90 is operably mounted in collet 82, so that the positioning rod or slide member 84 may be locked in a position corresponding to, or deliberately different than, the position of the positioning rod 88.

We may provide evenly spaced marks or indicia 96 along the length of positioning rod or slide member 84, and evenly spaced marks or indicia 98 along the length of positioning rod or slide member 88 for facilitating the accurate placement of these members in a desired location or relationship. As an example, each of the positioning rods may be six inches in length, with the marks or indicia placed every one-half inch, but we are obviously not limited either to this length or to this spacing. As should be quite apparent, the positioning rods 84 and 88 are provided in an array of sizes to accommodate the needs of certain users for relatively short or relatively long rods, depending on the size of the bed of the grinder.

As should now be clear, by virtue of the positioning rods 84 and 88 being able to be secured in positions of different effective lengths, our tool 10 may be disposed in a desired relationship to the bench or other mounting means upon which a rotary grinder, belt grinder or the like is mounted. It is this construction that makes it readily possible for a user to grind the ends of numerous, substantially identical components such as U-bolts to a consistent configuration and angularity, as will be described in conjunction with FIGS. 3, 4 and 5.

There are many instances in which it may be desirable to grind the end of a bolt or other single axis component to a precise length, without regard to the particular angularity of the end of the component. This is of course in contrast with the ability of our device to enable the legs of a U-bolt or the like to be ground to specified unequal lengths and to a particular angularity. As previously mentioned, in FIG. 4 we show in dashed lines, the relationship of the positioning rods 84 and 88 making it possible to grind a square end on a single axis component or a dual axis component.

With reference now back to the embodiments of FIGS. 1 and 2, in order to enable a user to grind a single axis component to a precise length, we prefer to utilize an adjustable spacing device 100 on the underside of the work-supporting means 20, which device 100 is only shown to a slight extent in FIGS. 1 and 2. However we reveal in clearer detail in FIG. 2a that the adjustable spacing device 100 involves a mounting member 102 to which a collet 104 is rigidly attached. A pair of tapped holes 106 are located on the flat side of the mounting member 102, opposite the collet 104. Suitable bolts 108 are to be received in the tapped holes 106, with this arrangement enabling the mounting member 102 and its collet 104 to be mounted on the underside of the work-supporting means 20 in the manner shown in FIGS. 1 and 2. This is accomplished by inserting the bolts 108 into the previously-described slot 42 disposed along the centerline of the work-supporting means 20, with the heads 110 of the bolts 108 being large enough to engage the surface of the means 20 on each side of the slot 42, and with the threaded portions of these bolts extending through the slot 42 so as to engage the tapped holes 106 of the member 102.

Received in the collet 104 is a single slide member or rod 112, with the forwardmost end 114 of this member being available to contact the support means for the grinder means, such as the support member for a grind wheel or grind belt. A tightening means 116, involving a threaded device of the previously described type, threadedly engages a tapped hole located in the sidewall of the collet 104. An inner end of the tightening means may be brought into forceful contact with the slide member or rod 112, so as to secure it firmly in what may be regarded as the appropriate length setting for the slide member or rod 112. By setting the slide member or rod 112 such that the outermost tip 114 is in a desirable relationship to the bench or support for the grinder means, the user, by the use of this adjustable spacing device, can be assured that the outermost end of each successive component B will be ground to a desired and consistent length.

Returning now to a consideration of the previously-described depth establishing device 50 depicted in FIGS. 1 and 2, we regard it as being most important for the user to be able to remove an already-ground component from the selected bushing means without the user having to change the setting of the slide member or depth-controlling member 56. It is for this reason we advantageously provided the hinged relationship depicted in FIG. 2, wherein the work-supporting means 20 is enabled to pivot, on occasion, downwardly about the previously-mentioned hinge pin 26.

To permit the work-supporting means 20 to normally be held in the fully operational relationship with the base member 12 as depicted in FIG. 1, we of course provide the previously-mentioned latch member 23 on the elongate portion 22 of the means 20, which latch member is normally engaged by the spring biased latch pin 24. As previously-mentioned, the latch pin 24 is slidably mounted in a lower portion of the mounting means 52, in accordance with construction that will be discussed in greater detail in conjunction with FIG. 3. As a result of this arrangement, the spring biased latch pin 24 normally resides in a firm, operational contact with the latch member 23 that is rigidly mounted on the elongate portion 22 of the means 20. This latch means or latch arrangement is the same for all embodiments of our invention, and it serves to hold the base member 12 and the work-supporting means 20 in an operational arrangement until such time as the work-supporting means is to be pivoted about the hinge pin 26 to the position depicted in FIG. 2, so that an already-ground workpiece can be removed.

Turning now to a detailed consideration of FIG. 3, it is to be understood that an important purpose of this invention is to enable a U-shaped component C to be supported such that the ends of its legs will reside at a carefully selected angle to a grinding device, such as that depicted at G in FIG. 4. Except for a different configuration of the work-supporting means in FIG. 3, which is now designated as work-supporting means 120, most of the other components of the device depicted in FIG. 3 are the same as were described in conjunction with the embodiment of FIGS. 1 and 2. Therefore, it will be noted that most of the reference numerals utilized on FIG. 3 are the same as those previously used and previously explained.

By the appropriate use of the previously-mentioned slide members or positioning rods 84 and 88, that can be readily adjusted to different lengths and then tightly maintained in the selected positions, it is apparent that our device makes it relatively easy for a user to cause one leg of the U-shaped component C to be longer than the other leg, and to cause the end of the one leg of the U-shaped component to be disposed at the same angle as the end of the other leg. Because of the previously mentioned procedure of moving the work-supporting means about the hinge pin 26 at such time as the grinding of one component has been completed and a new component is to substituted, the setting of the slide member or depth-controlling member 56 of the depth-establishing device 50 need not be disturbed, and a large number of like components can be ground to a selected length and/or angularity on a very rapid and consistent basis.

It is to be noted that the work-supporting means 120 of FIG. 3 is wider than the work-supporting means 20 of the previous embodiment, and this greater width enables two parallel slots, slots 140 and 142, to be disposed in the means 120, in lieu of the previously-described single slot 42 in the means 20. The slots 140 and 142 are both parallel to the longitudinal centerline 28—28.

As will be seen by an inspection of FIG. 3, a pair of mounting members are utilized for supporting the separate legs of the U-shaped component C, with mounting member 130 being mounted over the slot 140, and mounting member 132 being mounted over the slot 142. The underside of both of these mounting members is equipped with a pair of threaded holes, which are intended to receive bolts 144 inserted through the respective slots 140 and 142. As is obvious, the heads of these bolts are large enough as not to be able to pass through the slots, so it is readily possible to tightly affix these mounting members to the work-supporting means 120.

Supported on the mounting member 130 is a device 134 in the nature of a collet, and supported upon the mounting member 132 is a device 136 in the nature of a collet, with these devices each being of a size to receive one leg of a U-shaped component to be ground. By virtue of the provision of longitudinally extending slots 140 and 142, the user, by loosening the bolts 144, can readily adjust the relationship of the mounting members 130 and 132 as well as the respective collets to the forward edge of the work-supporting means 120. Also, it is readily possible for the user to entirely remove the collet-like members 134 and 136, and to substitute collets of a different internal diameter.

Inasmuch as a dual axis component such as a U-bolt cannot rotate during the time it is being ground, we do not ordinarily find it necessary or desirable to use a bushing means of the type described in conjunction with FIG. 1a, which of course involved a needle bearing 36 receiving a bushing 38. However, if the construction of FIG. 1a for some reason was desired in conjunction with the embodiment of our invention shown in FIG. 3, we could of course substitute the previously-described bushing means in lieu of the collet-like members 134 and 136.

We are aware of the fact that not only may the legs of one U-shaped member be of a different wire diameter than the legs of another U-shaped member, but also the legs of one U-shaped member may be spaced a different distance apart than the legs of another U-shaped member. To that end we may provide orthogonally placed slots adjacent a forward portion of the work-supporting means 120, so that the user may move one collet toward or away from the other collet in order to accommodate a particular U-shaped member. In FIG. 5 we show typical orthogonally placed slots of a suitable type.

It is important to note that we cause the ends of the U-shaped component illustrated in FIG. 3 to protrude beyond the forward edge of the work-supporting means 120. This arrangement makes it readily possible for the user to bring these ends into contact with the bench grinder or belt grinder in the general manner depicted in FIG. 4, so that the ends can be ground to a selected angle, which may, for example, be an angle of 13°.

In the same manner described in conjunction with the earlier figures, we may utilize in FIG. 3, a depth-establishing device 50 of the previously-described type, which of course involves the mounting device 52, the collet member 54, the slide member or depth-controlling member 56 and the tightening device 62. It will be noted in FIG. 3 that we have shown the collet 54 partially broken away in order to reveal internal detail, such as the threads 64 on the tightening device 62. In FIG. 3 we have also shown the member 52 in the vicinity of the spring biased latch pin 24 broken away in order to reveal that the pin 24 is biased by a compression spring 60 that normally biases the latch pin outwardly, in the direction toward the latch member 23. A suitable shoulder 61 on the aft end of the spring biased latch pin 24 prevents it from being entirely expelled from the mounting device 52.

Extending through the hollow central portion of the compression spring 60 is a shaft member 65 of elongate construction, which is affixed in a right-angle relationship to handle member 66. The handle member 66 is configured so as to be easily grasped by the user, and this handle is visible in FIGS. 1 and 2 as well as in FIG. 3.

As is apparent, this arrangement readily enables the user, by grasping the handle 66, to pull the latch pin 24 against the bias of the compression spring 60 for a sufficient extent as to permit the latch member 23 to move past the latch pin 24. As a result of this, the work-supporting means or device 20 is enabled to drop down into the general position depicted in FIG. 2.

It is to be noted from FIG. 2 that the undersurface of the latch member 23 is angled in a manner similar to the angling of the movable portion of a conventional door latch, so as the user moves the work-supporting means 20 upwardly, subsequent to the insertion of the new component to be ground into the collet, the angled undersurface of the latch member 23 readily moves past the latch pin 24. By our utilization of the compression spring 60, the latch pin 24 automatically resumes the outwardly-extending position after the latch member 23 has moved past the pin 24, in which outwardly-extending position the latch pin 24 normally engages the latch member 23 and holds the work-supporting means 20 firmly in the operational position in which the base member 12 and the work-supporting means 20 are caused to reside in substantially planar relationship.

Recalling the depth-establishing device 50, it should be noted in FIG. 3 that the enlarged member 58 disposed on the end of the depth-controlling member 56 is clearly of a size large enough to contact the end of a U-bolt of a wide range of different sizes, thus to assure the ends of each U-bolt extending for a consistent distance beyond the respective collet, into contact with the grinding means.

On the centerline 28—28 in FIG. 3, we show a hole 178 into which a bolt concerned with the support of the protractor 170 of FIGS. 4 and 5 can be inserted.

Turning now to a detailed consideration of FIG. 4, it will be seen that we have shown a device of the previously-described type in which a work support WS shown in full lines is disposed in an angled relationship to the grinding means G. In this particular instance the grinding means G is a belt, but we are not limited to this, and another type of grinding means could in many instances be used equally well. The surface S in FIG. 4 represents the bench or work table or mounting means upon which the grinding device is mounted.

By virtue of the fact that in FIG. 4, the positioning rod 88 has been extended for a lesser distance outwardly than the positioning rod 84, when the forwardmost tips or ends of these rods have been brought into contact with the surface S, this positions our hand held tool such that the leg of the U-shaped component nearest the positioning rod 88 such that it can be extensively ground away, whereas the leg of the U-shaped component nearer the positioning rod 84 will remain significantly longer. Importantly, the tips of both of these legs will be ground at the same angle, making it a relatively simple manner to create a large number of substantially identical U-shaped members that could be welded at a specified angle to a mounting surface. An example of this might be the rack of a dishwasher or other type of power washer, wherein it was desirable to have U-shaped members mounted at a prescribed angle to the rack, rather than being mounted in a vertical relationship to the rack. Our novel arrangement makes it a relatively simple matter for a user to create a large number of U-shaped members of identical length and configuration, with the tips of both of the legs of all of the components residing at the same angle to the centerline of the legs of the U-shaped components.

We obviously are not limited to an arrangement for grinding the legs of a U-shaped component to unequal lengths, for by disposing the work support WS in a perpendicular relationship to the grinding means G, as shown in dashed lines in FIG. 4, the legs of the U-shaped component will be ground to an equal length, and the ends of the legs will be square. In this latter instance, however, both of the positioning rods 84 and 88 should be set to the same length, so that the outermost tips of the rods 84 and 88 will both contact the surface S in a perpendicular relationship, and thus serve to hold the workpiece to be ground in a perpendicular relationship to the grinding means G.

Turning now to FIG. 5, we have shown an embodiment in which essentially the same depth-establishing components are utilized, involving for example the slide member or depth-controlling member 56 and the enlarged, component contacting member 58; the same hinge pin 26; and the same latching means, involving the latch member 23 and the spring biased latch pin 24. The embodiment of FIG. 5 differs, however, in the use of a substantially larger work-supporting means 150 that we prefer to utilize in order that comparatively large U-shaped components can be accommodated. In accordance with this embodiment, a pair of slots 152 and 154 are provided in a perpendicular relationship to the slide member or depth-controlling member 56 of the depth-establishing device 50 that we use. In other words, the slots 152 and 154 extend laterally rather than longitudinally, and are in an orthogonal relationship with the centerline 28—28. Because the mounting members 160 and 162 are movable laterally along the slots 152 and 154, the collets 164 and 166 carried by the mounting members 160 and 162 can be moved together or apart, so as to accommodate the particular width of the U-shaped component whose ends are to be ground. Suitable screws extending upwardly through the slots 152 and 154 and entering the underside of the members 160 and 162 in a threaded relationship are responsible for securing the members 160 and 162 and their respective collets in a fixed relationship, so that a large number of successive U-shaped members of precisely the same basic configuration can be ground.

As before, the preferred depth-establishing components including the slide member or depth-controlling member 56 and the enlarged, component contacting member 58 function to prevent "retreat" of the U-shaped component during the time that its ends are being ground.

Also depicted in FIG. 5 is a protractor 170 that is rotatably mounted upon a mid portion of the work-supporting means 150, with the pivot point for this protractor being located on the longitudinal centerline 28—28 of the work-supporting means 150. We utilize a large-headed pin 172 for rotatably securing the protractor in the desired relationship to the work-supporting means 150, with the lower end of the pin 172 being inserted into the previously-mentioned hole 178 visible in FIG. 3. We utilize an index mark 174 on the longitudinal centerline 28—28, at a location between the hole 178 and the hinge pin 26, which index mark coincides with the 90° mark of the protractor 170 when the protractor is in the "squared" or non-angled relationship illustrated in FIG. 5. A suitable locking device such as a lock nut or wingnut 176 threadedly engages the threads located on the lower end of the pin 172, in the manner shown in FIG. 5*a*, so that when the user tightens the wingnut or lock nut 176, the protractor is held firmly in a desired relationship to the work-supporting means.

As is obvious, when the protractor is positioned such that the 90° mark of the protractor is in coincidence with the index mark 174, the straight edge 180 of the protractor 170 is perpendicular to the longitudinal centerline 28—28 of the tool 10. By way of example, when the protractor is moved with respect to the work-supporting means such that the 60° mark on the protractor coincides with the index mark 174, the straight edge 180 of the protractor will be at a 60° angle with respect to the centerline 28—28.

In FIG. 4, our hand-held tool depicted in dashed lines is in a 90° relationship to the grinder G, with of course the straight edge 180 of the protractor being in a parallel relationship with the edge S of the grinder bench when the 90° mark on the protractor coincides with the index mark 174.

Our hand held tool 10 may be turned to the left or right of a line perpendicular to the grinder G, depending on which leg of the U-bolt, for example, is desired to be longer.

It should now be clear that our novel arrangement makes it unnecessary for an operator having to guess when the legs of a multi-axis component have been ground to a specified length and angularity, for it is apparent that we are able to rely upon the individually adjustable positioning rods 84 and 88 being adjusted to lengths appropriate in order that the work-supporting means and the work-clamping device will hold the workpiece in a preselected angular relationship to the rotary grinder, belt grinder, or other such grinding means.

It was earlier explained that it would be quite undesirable to have to change the positioning of the depth-controlling member 56 just to permit a freshly-ground component to be removed, so that a new, unground U-shaped component can be inserted into the collets 134 and 136, or the collets 164 and 166. The setting of the depth-controlling member 56 manifestly should not be disturbed inasmuch as it is the consistency of the location of the depth-controlling member 56 and the member 58 with respect to each U-shaped component that assures that both legs of each successive U-shaped component will be ground to a prescribed length and angle. Therefore, instead of any other arrangement, we have provided the hinge arrangement utilizing the hinge pin 26, as was described at length in conjunction with the embodiment of FIGS. 1 and 2.

It should already be clear from the illustration in FIG. 3 with regard to the release of the latch pin 24 that at such time as a freshly ground U-shaped component C is to be removed, the user pulls the handle member 66 to release the latch member 23 such that the work-supporting means 120 can rotate downwardly about the hinge pin 26 with respect to the base member 12, with this causing the U-shaped member C to move out of contact with the slide member or depth-controlling member 56 and the enlarged end member 58, which remain in their same positions. This makes it quite easy for the user to remove the freshly ground U-shaped component from the collet members 134 and 136, and to quickly insert the next U-shaped member to be ground.

Similarly, in the embodiment of FIG. 5, upon the work-supporting means 150 being released to pivot downwardly about the pivot pin 26, it becomes relatively easy to remove the freshly ground U-shaped component from the collet members 164 and 166, and to immediately insert the next U-shaped member to be ground.

It should also be clear that the slide member or depth-controlling member 56 and the enlarged, component contacting member 58 prevent a U-shaped member from "retreating" during the grinding operation, thus assuring that each successive U-shaped member will be of the same size and the same configuration as the previous ones.

The operation of our multipurpose tool is as follows:

Presuming for example that the end of a component or workpiece is to be ground to an angle of 26°, the user loosens the locknut or wingnut 176 of FIG. 5a, so that the protractor 170 may be rotated away from the 90° mark in the desired direction. After a particular point on the graduated, curved edge of the protractor 170 has been aligned with the index mark 174, the protractor is locked in the new position by tightening the locknut 176.

The tightening means 90 and 92 are now loosened, permitting the positioning rods 84 and 88 to be readily adjusted in a lengthwise manner. The straight edge 180 of the protractor 170 is now brought into a parallel relationship with the edge S of the grinder bench. This can usually be accomplished quite well by eye, but if particular accuracy is involved, this visual alignment can be followed up by the use of a ruler for measuring the distance from the edge 180 of the protractor to the edge S of the bench. When the distance from one end of the protractor edge 180 to the adjacent edge S of the bench, is the same as the distance from the other end of the edge 180 to the adjacent edge S, it can be concluded that the straight edge 180 of the protractor is parallel to the edge S of the bench.

The forwardmost or active ends of the positioning rods 84 and 88 are now brought into firm contact with the edge S of the bench, after which the tightening device 90 is utilized to lock the positioning rod 84, and the tightening device 92 is utilized to lock the positioning rod 88. In this way the positioning rods 84 and 88 are secured in positions reflecting the desired angularity of the grinding operation to take place. A recheck of the positioning of the edge 180 of the protractor 170 with respect to the edge S can now be undertaken if desired.

The protractor 170 no longer needs to be mounted on the member 120 or 150, so it can be removed by loosening the lock nut or wingnut 176, and set aside for the next use.

The grinding can now proceed, with the active ends of the positioning rods 84 and 88 continuing to remain in contact with the edge or surface S, thus to assure that the grinding of each successive component will be accomplished in an accurate manner.

As is obvious, when the ends of a component different from the preceding components are to be ground, the user or operator can go through the procedure of reinstalling the protractor 170, and then rotating the protractor with respect to the mark 174 until the desired angularity of the edge 180 has been achieved. The operator then proceeds to align the straight edge 180 of the protractor with the surface or edge S. When this has been accomplished, the active ends of the positioning rods are brought into contact with the surface or edge S, and the positioning rods 84 and 88 are locked in the adjusted positions. The protractor can now be removed and set aside for future use, so that grinding of the ends of the components or workpieces can proceed.

We are not to be limited to any particular constructional materials, but tool steel is quite satisfactory in most instances, although in certain other instances, it is desirable to make the components of stainless steel or some other non-rusting, noncorrosive material.

Inasmuch as the protractor 170 is not normally subjected to heavy use, it can be made of aluminum, which is a considerably less expensive material to utilize for such an application.

We claim:

1. A device for supporting a workpiece for being ground to size by the use of mechanical grinding means including a belt grinder and a disk grinder, said device comprising a base member having a work-supporting means operably associated therewith, said base member supporting said work-supporting means by an interconnection means constructed to enable said work-supporting means to be moved with respect to said base member on occasion in a substantially vertical plane passing through said base member, said work-supporting means having thereon a work-clamping device, said work-clamping device including means for holding a workpiece in a selected position, such that a portion of the workpiece held in said work-clamping device can be brought into direct contact with the selected grinding means, a depth-controlling member mounted upon said base member, with a part of said depth-controlling member being positioned to contact a workpiece held in said work-clamping device, the position of said depth-controlling member being adjustable, so that the amount of material to be removed from the workpiece by the grinding means can be selectively controlled, said interconnection means making it readily possible for said work-supporting means to be moved in the substantially vertical plane passing through said base member such that the workpiece can be removed from said work-clamping device without altering the position of said depth controlling member.

2. The device for supporting a workpiece for being ground to size as recited in claim 1 in which said base member and said work-supporting means are disposed in substantial alignment during a workpiece grinding procedure.

3. The device for supporting a workpiece for being ground to size as recited in claim 2 in which latch means are utilized for controlling the relationship of said work-supporting means to said base member, said latch means normally holding said work-supporting means in an essentially parallel relationship to said base member, but upon manipulation of said latch means by a user, said work-supporting means can be readily moved with respect to said base member, to make readily accessible, the workpiece that has been ground, and permit the ready release of the workpiece.

4. The device for supporting a workpiece for being ground to size as recited in claim 1 in which said interconnection means is a hinge means making possible said work-supporting means being movable out of an aligned relationship with said base member, the workpiece, after being ground to a selected size and configuration, being able to be released without altering the position of said depth-controlling member, such release being assisted by the use of said hinge means for bringing about movement of said work-supporting means with respect to said base member.

5. The device for supporting a workpiece for being ground to size as recited in claim 1 in which position-controlling means are attached to said work-supporting means, said position-controlling means being effective for establishing a precise position of said work-clamping device and therefore the workpiece with respect to the grinding means.

6. The device for supporting a workpiece for being ground to size as recited in claim 1 in which said work-clamping device is a dual unit symmetrically located with respect to the longitudinal centerline of said work-supporting means, said work-clamping device being adapted to receive a workpiece of generally U-shaped configuration.

7. The device for supporting a workpiece for being ground to size as recited in claim 1 in which said work-clamping device is a single unit, disposed on the longitudinal centerline of said work-supporting means, said work-clamping device being adapted to receive a single axis workpiece.

8. The device for supporting a workpiece for being ground to size as recited in claim 7 in which an adjustable spacing device is mounted on said work-supporting means, said adjustable spacing device enabling a selected amount of the single axis workpiece to be removed.

9. The device for supporting a workpiece for being ground to size as recited in claim 1 in which a protractor is operatively mounted on said base member, with the position of the protractor on the base member being readily adjustable with respect to the longitudinal centerline extending through said base member, said protractor, when set at a desired angle to such longitudinal centerline, enabling the user to bring about the grinding of the end of the workpiece at the desired angle.

10. A device for supporting a workpiece for being ground to size by the use of mechanical grinding means including a belt grinder and a disk grinder, said device comprising a base member having a work-supporting means operably associated therewith, said base member supporting said work-supporting means by the use of a hinge member, such that the relationship of said work-supporting means to said base member may, on occasion, be readily changed by a user, said base member supporting a pair of positioning rods disposed in a spaced-apart, parallel relationship to the longitudinal centerline of said base member, each of said positioning rods having a forwardmost end whose position with respect to said work-supporting means can be readily adjusted, said work-supporting means having thereon a work-clamping device, said work-clamping device having means for holding a workpiece in a selected position, such that a portion of the workpiece held in said work-clamping device can be brought into direct contact with the grinding means, means for mounting a depth-controlling member upon said base member, with a part of said depth-controlling member being positioned to contact a workpiece held in said work-clamping device, the position of said depth-controlling member being readily adjustable, so that the amount of material to be removed from the end of the workpiece by the grinding means can be selectively controlled, the user, by extending the forwardmost ends of said positioning rods to dissimilar positions and into contact with a member operatively associated with the grinding means, enabling the end of the workpiece to be ground at a selected angle.

11. The device for supporting a workpiece for being ground to size as recited in claim 10 in which the workpiece, after being ground to a selected size and configuration, can be released without altering the position of said depth-controlling member, such release being assisted by the use of said hinge member for bringing about rotative movement of said work-supporting means with respect to said base member.

12. The device for supporting a workpiece for being ground to size as recited in claim 10 in which latch means are utilized for controlling the relationship of said work-supporting means to said base member, said latch means normally holding said work-supporting means in an essentially parallel relationship to said base member, but upon manipulation of said latch means by a user, said work-supporting means can be readily rotated about said hinge member with respect to said base member, to permit the ready release of the workpiece that has been ground.

13. The device for supporting a workpiece for being ground to size as recited in claim 10 in which position-controlling means are attached to said work-supporting means, said position-controlling means being usable for establishing a precise position of said work-clamping device and therefore the workpiece with respect to the grinding means, said position-controlling means including adjustment means enabling a user to readily adjust the desired relationship of said work-clamping device to said work-supporting means.

14. The device for supporting a workpiece for being ground to size as recited in claim 10 in which said work-clamping device is a dual unit symmetrically located with respect to the longitudinal centerline of said work-supporting means, said work-clamping device being adapted to receive a workpiece of generally U-shaped configuration.

15. The device for supporting a workpiece for being ground to size as recited in claim 14 in which the user, by extending the forwardmost ends of said positioning rods to dissimilar positions and into contact with a member associated with the grinding means, is enabled to grind the ends of the U-shaped workpiece at a selected angle, and the legs of the U-shaped workpiece to dissimilar lengths.

16. The device for supporting a workpiece for being ground to size as recited in claim 10 in which said work-clamping device is a single unit, disposed on the longitudinal centerline of said work-supporting means, said work-clamping device being adapted to receive a single axis workpiece.

17. The device for supporting a workpiece for being ground to size as recited in claim 16 in which an adjustable spacing device is mounted on said work-supporting means, said adjustable spacing device enabling a selected amount of the single axis workpiece to be removed.

18. The device for supporting a workpiece for being ground to size as recited in claim 16 in which the user, by extending the forwardmost ends of said positioning rods to dissimilar positions and into contact with a member operatively associated with the grinding means, is enabled to grind the end of the workpiece at a selected angle.

19. The device for supporting a workpiece for being ground to size as recited in claim 10 in which a protractor is operatively mounted on said base member, with the position of the protractor on the base member being readily adjustable with respect to the longitudinal centerline extending through said base member, said protractor, when set at a desired angle to such longitudinal centerline, enabling the user to bring about the setting of the positioning rods at precisely established lengths, thus to readily make possible the grinding of the end of the workpiece at the desired angle.

20. A device for supporting a workpiece for being ground to size by the use of mechanical grinding means including a belt grinder and a disk grinder, said device comprising a base member having a work-supporting means operably associated therewith, said base member supporting said work-supporting means by the use of a hinge member, such that the relationship of said work-supporting means to said base member may, on occasion, be readily changed by a user, said base member having means thereon supporting a pair of positioning rods disposed in a spaced-apart, parallel relationship to the longitudinal centerline of said base member, each of said positioning rods having a forwardmost end whose position with respect to said work-supporting means can be readily adjusted, means for locking said positioning rods in selected positions, said work-supporting means having thereon a work-clamping device, said work-clamping device including means for holing therein a workpiece in a selected position, such that a portion of the workpiece held in said work-clamping device can be brought into direct contact with the grinding means, a depth-controlling member mounted upon said base member, with a part of said depth-controlling member being positioned to contact a workpiece held in said work-clamping device, the position of said depth-controlling member being readily adjustable, so that the amount of material to be removed from the end of the workpiece by the selected grinding means can be selectively controlled by appropriate adjustment of said depth controlling member, said positioning rods, when extended to dissimilar positions, with the forwardmost ends of said positioning rods brought into contact with a member operatively associated with the grinding means, enabling said work-clamping device to be held at a selected angle to the grinding means, whereby the end of the workpiece can be ground to that selected angle.

21. The device for supporting a workpiece for being ground to size as recited in claim 20 in which said work-clamping device is a single unit, disposed on the longitudinal centerline of said work-supporting means, said work-clamping device being adapted to receive a single axis workpiece.

22. The device for supporting a workpiece for being ground to size as recited in claim 20 in which said work-clamping device is a dual unit symmetrically located with respect to the longitudinal centerline of said work-supporting means, said work-clamping device being adapted to receive a workpiece of generally U-shaped configuration.

23. A device for supporting a workpiece for being ground to size by the use of mechanical grinding means, said device comprising a base member and a work-supporting means, said work-supporting means having thereon a work-clamping device, interconnection means operably interconnecting said work-supporting means with said base member, with said interconnection means enabling said work-supporting means to be relatively movable with respect to said base member in a substantially vertical plane passing through said base member, said work-supporting means being movable into and out or an operative relationship with base member, said work-clamping device having means for holding a workpiece in a selected position, such that a portion of the workpiece held in said work-clamping device can be brought into direct contact with the selected grinding means when said work-supporting means has moved into said operative relationship with said base member, a depth-controlling member mounted upon said base member, with a part of said depth-controlling member being positioned to contact a workpiece held in said work-clamping device when said work-supporting means has been brought into said operative relationship, means for adjusting the position of said depth-controlling member, so that the amount of material to be removed from the workpiece by the grinding means can be selectively controlled, said interconnection means making readily possible a motion of said work-supporting means in the substantially vertical plane away from said operative relationship with respect to said base member such that the workpiece can be removed from said work-clamping device without altering the position of said depth controlling member.

\* \* \* \* \*